Nov. 7, 1967  L. BAUM ETAL  3,351,072
TOBACCO SMOKE FILTER
Filed Nov. 16, 1965
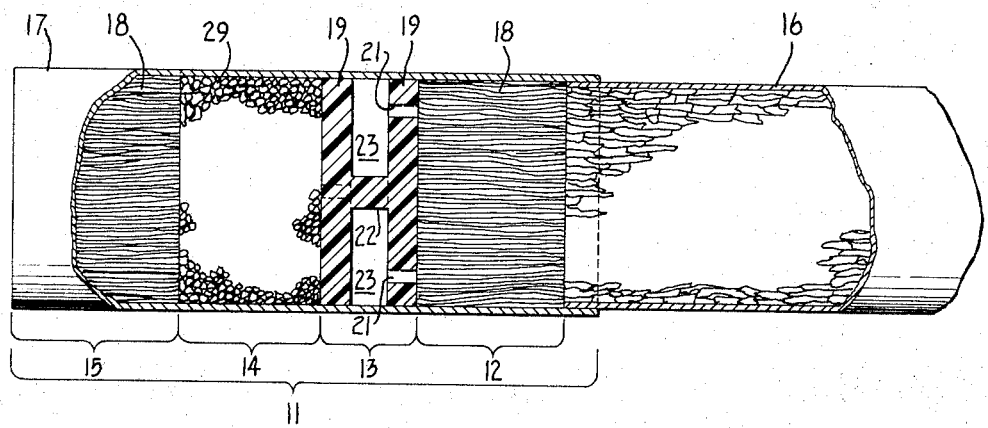
FIG_1
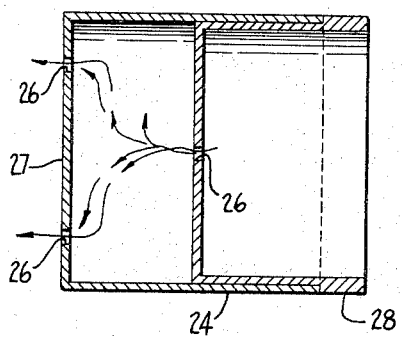
FIG_2
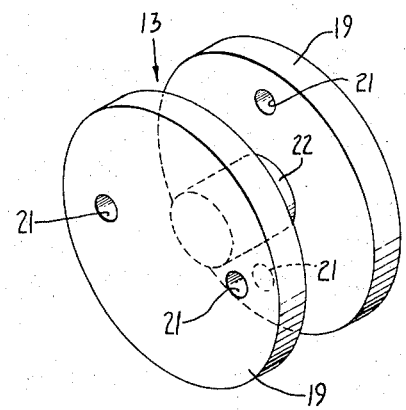
FIG_3
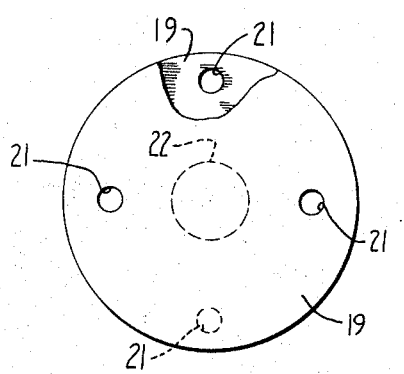
FIG_4
INVENTORS.
LEO BAUM
DOUGLAS W. WATKINS
BY
Gardner & Zimmerman
ATTORNEYS

United States Patent Office 3,351,072
Patented Nov. 7, 1967

3,351,072
TOBACCO SMOKE FILTER
Leo Baum, Oakland, and Douglas W. Watkins, Hayward, Calif., assignors to Esco Corporation, Portland, Oreg., a corporation of Oregon
Filed Nov. 16, 1965, Ser. No. 508,060
6 Claims. (Cl. 131—266)

ABSTRACT OF THE DISCLOSURE

A tobacco filter including a pair of axially spaced cylindrical filters of sorptive material with a pair of axially spaced apertured disk-like partitions disposed between such filters.

---

The present invention relates to filters for removing harmful constituents from tobacco smoke, and appertains more particularly to a filter comprising a mechanical jet impactor filter section in combination with chemical filter sections, productive of high filtering efficiency due to improved discharge and retention of harmful ingredients within the filter.

The recently published Surgeon General's Report on Smoking and Health has firmly established that a causal relationship exists between smoking and serious diseases, notably lung cancer and cardio-vascular ailments. Moreover, the statistical studies do not show any significant beneficial effects attained by prior art filters, presumably due to their inefficiency in removing sufficient quantities of the pathogenic constituents from tobacco smoke.

The prior art is replete with filters providing a generally tortuous path for the smoke wherein heavy vapors are cooled and condensed, and/or wherein vapors or solid constituents are removed by deposition onto a filter medium having a large surface to volume ratio. It has also been recognized that much of the heavy tarry substances contained in tobacco smoke can be eliminated by forcing the smoke through narrow openings onto baffles.

The relative ineffectiveness of these filters is, at least in part, thought to be due to the fact that as the condensed tars and volatile matter accumulate in the filter, they are revolatilized by the smoke of succeeding drafts and carried further through the filter.

Now, however, the present invention provides a filter which removes harmful constituents from tobacco smoke with improved effectiveness, and which is, in addition, capable of retaining a significantly enhanced fraction of the discharged smoke constituents within the filter.

In general, the present filter is a composite of mechanical and chemical filters, which are structurally and sequentially integrated to both efficiently discharge harmful smoke components as well as maximize the capacity for storing the discharged materials, without increasing the physical size of the filter, or substantially increasing the cost thereof.

Accordingly, a first filter section of fibrous materials is disposed in the front end of the filter as the first filtration stage to initially remove the bulk of tars and nicotine from the smoke. The main stage of the present filter comprises an activated charcoal composite or similar surfactive sorbent, and a fibrous end plug. In addition, however, the present filter includes a mechanical impactor filter section disposed between the first fibrous filter stage and the charcoal or surfactive sorbent composite. The unexpectedly enhanced ability of the present filter over and above the sum of the individual capabilities of the filter sections is theorized to be due to the sequential arrangement of the filter sections. The first fibrous stage and the second mechanical stage cooperate to produce an initial reduction and delay in the harmful constituents carried by the smoke further into the filter. The second mechanical stage acts as a barrier to a progressing wave of tar constituents moving down through the filter. This wave is generated by successive drafts of hot smoke which continuously revolatilize and redeposit tars. In time this material progresses further down the filter eventually "inundating" as it were the activated charcoal section. The mechanical stage intercepts this material and thereby protects the charcoal filter. The active charcoal surfaces forming the multi-cavernous smoke passage through the charcoal filter are prevented from becoming saturated and thus continue to effectively interact with the smoke sol.

Accordingly, it is a primary object of the present invention to provide an economical multistage filter for tobacco smoke, which prevents the seepage of tars and other condensed materials through the filter.

A further object of the present invention is to provide a sequential arrangement of fibrous, mechanical impactor, and chemisorptive filter sections characterized by enhanced discharge efficiency as well as maximum capacity to retain the harmful constituents discharged within the filter.

A still further object of the present invention is to provide a mechanical impactor filter which is productive of a smoke motion characterized by effective condensation of heavy smoke constituents onto an impactor wall as well as minimal revolatilization and carry-over of discharged material by successive drafts of smoke. Such a filter is produced by precise control of the tubular impactor nozzle dimensions as well as the distance of the impactor baffle surfaces from the nozzle exits and the relative position of the nozzles with respect to one another.

A still further object of the present invention is to provide a chemisorptive filter stage which is capable of burying discharged materials by intermittent solution and precipitation of a portion of the filter material.

Other objects and features of the invention will become apparent to those skilled in the art upon consideration of the following description of specific embodiments in conjunction with the drawings.

FIGURE 1 illustrates a cigarette filter according to the invention in longitudinal section.

FIGURE 2 is a cross-sectional view of an alternative mechanical impactor filter stage.

FIGURES 3 and 4 illustrate another alternative mechanical impactor in section.

As shown in FIGURE 1, filter 11 is a composite of four cylindrical filter sections, 12, 13, 14 and 15 respectively, which are disposed successively in axial alignment with the body of cigarette 16 and joined thereto by means of overlapping outer wrapper 17 of cork or paper.

Filter section 12 is a compact of fine fibers 18, such as cellulose or cellulose acetate, for example. The fibers are preferably oriented longitudinally to provide myriad smoke passages in the axial direction.

The next filter section in the direction of flow of the smoke is the mechanical impactor filter 13 disposed adjacent fibrous filter section 12. The mechanical impactor 13 comprises a plurality of transverse partitions 19, which have a circular cross-section and extend peripherally to the inside surface of wrapper 17. Each partition is apertured to define smoke passages 21 in the axial direction. The smoke passages serve to form and direct a high velocity smoke jet onto the succeeding partition. Accordingly the dimensions of the smoke passages as well as the relative orientation and distance between the partitions are critical. The diameter of the smoke passages is between about .029 and .038 inch and the length of the smoke passages is at least about .03 inch. The distance between the smoke exit end of the smoke passage and succeeding partition whereupon the smoke jet is impacted, is less than about .03 and generally between about .01 and .02 inch. The correct spacing between the partition is maintained by spacer 22. Successive partitions are rotated with respect to one another, to provide a staggered arrangement of the jet forming smoke passages. The tarry or oily discharge from the smoke is retained in annular plenum 23, which is defined by the partitions, spacer and wrapper.

An alternate "metal button" jet impactor filter is shown in FIGURE 2. This filter is comprised of a plurality of cup shaped members 24 which are provided with one or more perforations 26 suitably distributed over the bottom portions 27 of said metal cups. The dimensions and spacings of the partitions 27 and perforations 26 are similar as set forth supra. The metal cups 24 fittingly engage each other, the proper distance between the partitions being maintained by flange 28, for example.

The third filter section 14, adjacent mechanical impactor filter 13, is comprised of a sorptive material having a high surface area to volume ratio. The preferred filter material is activated charcoal 29 in the form of compacted granules or powder.

The final filter stage 15 is preferably a fibrous filter similar as the first filter stage, which may be impregnated with a volatile flavoring agent for reintroducing taste and aroma into the partially depleted tobacco smoke, in accordance with conventional practice.

As set forth in the description above, smoke entering the first filter stage 12 from the tobacco filled body of the cigarette, deposits the initial bulk of the tars and other materials suspended in the smoke onto the surfaces of the fibrous filtering agent. However, as the smoking article is consumed a zone heavily laden with tars progresses through the filter towards the mouthpiece, and actually replenishes the tar content of the smoke passing through it. To prevent saturation of the charcoal filter, the smoke is forced to discharge the heavy materials again by being impelled against the partition 19 by the smoke passages through the first partitions. Obviously, if these smoke passages are too narrow, the smoker will have to apply an unsatisfactory amount of suction. The smoke passages provided in the instant invention are therefore at least about .03 inch long to collimate and direct the smoke against the succeeding partition baffles. The discharged tar is stored in the plenum 23. It has been found that plenum 23 has sufficient capacity to retain the tars even though only .01 inch in thickness, which is due to the auxiliary retention of a large fraction of the tar within the first fibrous filter stage. The dimensions of the smoke passages through the final partition are somewhat less stringent, since they serve primarily to distribute the smoke over the charcoal filter section, rather than functioning as jet forming nozzles. Nevertheless the cross-sectional area has been found to be preferably small to prevent seepage and premature escape of tar laden smoke from plenum 23 into the charcoal filter section.

The filter described hereinabove provides improved filtering action for tobacco smoke primarily by enhanced retention of the tarry substances in the first two filter sections. Their combined delay and barrier action conserves the charcoal filter section which continues to interact with the smoke as it passes on through the filter towards the mouth of the smoker.

However, we have discovered modified filtering means which provide improved trapping action for discharged smoke and tars independently.

A mechanical filter which operates on the impaction principle is shown in FIGURES 3 and 4. While the jet impactor shown in this figure is generally similar to impactors described above, e.g., with respect to the dimensions of the nozzle passages and separation of successive impactor partitions, the important feature of such a filter is the relative orientation of the nozzle passages through successive discoidal partitions. The nozzle passages 21 pervade an outer annular portion of each impactor partition and are preferably disposed at regular angular intervals about the center of the partition. The radial distance of the individual nozzle passages from the axis of the filter may vary somewhat, however, it is generally preferred to dispose the passages at the same radial distance in each partition, and at a lesser radial distance in successive partitions in the axial direction of smoke flow. While previously impactor smoke passages have been disposed in staggered relation to each other, it has been thought that maximal removal rates are obtained if the smoke passages are staggered bisectionally. We have found however that smoke impacting the baffle actually strikes previously deposited tars and oils which are to some degree reabsorbed by the smoke and carried on through the filter. In the present impactor filter, however, the smoke moves about the central spacer section in a primarily unidirectional swirling fashion. This is brought about by the predominantly unilateral pull exerted upon smoke entering the annular plenum 23 by the nearest passage through the next partition. The heavy tars and vapors resorbed by the cigarette smoke are thus preferentially carried to the walls of the wrapper by virtue of their high inertia and the swirling motion of the smoke.

However, care must be taken that a sufficient angular distance is maintained between successive passages. If they are too closely aligned, the smoke will assume a curvilinear path and carry some of the tars through successive openings without impaction. Moreover, as the tars build up and spread from the point of impact, eventually the tar masses will flow into the passage of the next partition. The preferred distance between the center of impaction has been found to be at least about .02 inch, or in the case of a cigarette filter having two diametrically opposed apertures per partition, the preferred relative rotation of the apertures with respect to one another is about 30°.

We have further discovered that a chemical filter of improved tar retention may be made by including methyl cellulose in a filter. The methyl cellulose may be provided in the form of fine granules, disposed in a suitable cartridge between perforated partitions for retaining the granules. Alternatively, and preferably, a fibrous base material, such as cotton, cellulose, cellulose acetate, etc., is impregnated with a methyl cellulose slurry and dried. The improved retention of the tarry materials in a filter impregnated with methyl cellulose is believed to be due to the property of methyl cellulose of being soluble in cold water and insoluble in hot water. Accordingly, it is believed that the mechanism of improved trapping of tars and oily discharges in the filter medium involves cyclic solution and precipitation of methyl cellulose in the water vapor which condenses onto the filter fibres. As the discharged water vapor cools between drafts of smoke, the methyl cellulose dissolves in the water droplets, and as the filter is heated by exposure to hot smoke during the next draft, the methyl cellulose reprecipitates, actually burying tars and other condensed constituents. The overall result is an improvement in the retention fo harmful constituents in the filter compared to the conventional surface sorption processes.

Although the above specific description dealt only with a few specific embodiments of individual filter sections and combinations thereof, it will be realized by those skilled in the art that changes, modifications and other combinations may be made without departing from the spirit and scope of the present invention. Accordingly, the sole measure of the scope of the present invention is represented only by the following claims.

What is claimed is:

1. In a filter for tobacco smoke having an outer tubular jacket defining a smoke inlet and smoke outlet portion and a cylindrical smoke conduit extending therebetween, a filter section disposed in said cylindrical smoke conduit, said filter section comprising at least two spaced discoidal partitions of relatively non-porous material extending transversely across said smoke conduit coextensive with the cross-sectional area thereof; each of said partitions having tubular smoke passages extending therethrough in the generally axial direction of said filter section; said tubular smoke passages being between about .029 inch and .038 inch in diameter and at least about .03 inch in length; said discoidal partitions being disposed at a distance between about .01 and .03 inch from each other, successive partitions being disposed to provide a staggered orientation of the smoke passages through adjacent partitions; a first cylindrical filter means comprising a compacted sorptive material, said filter means being disposed in the smoke inlet portion of said smoke conduit and in contiguous relation with one of said partitions; a second cylindrical terminal filter means comprising sorptive materials disposed in the smoke outlet portion of said smoke conduit and in contiguous relation with the other of said partitions.

2. The filter section of claim 1 further defined in that said first filter means comprises a fibrous compact impregnated with methyl cellulose, and said second filter means comprises a first section of activated charcoal and a second section of a fibrous compact impregnated with methyl cellulose, said first section being disposed adjacent said other discoidal partition, and said second section being disposed in the outlet portion of said smoke conduit.

3. A tobacco filter cartridge comprising a tubular sleeve defining a smoke inlet and smoke outlet portion and a cylindrical conduit extending therebetween; a first cylindrical filter section of compacted sorptive material disposed in the smoke inlet portion of said sleeve; a plurality of spaced discoidal relatively non-porous partitions extending transversely across said cylindrical conduit coextensive with the cross-sectional area thereof; each of said partitions having a plurality of tubular smoke passages extending through an outer annular portion thereof; said tubular smoke passages being between about .029 and .038 inch in diameter and at least about .03 inch long; said discoidal partitions being successively disposed to extend transversely across the axis of said smoke passages with the adjacent partitions being spaced at a distance of less than about .03 inch from each other successive discoidal partitions being rotated in their plane with respect to one another by an amount less than half the angular distance between adjacent passages in said partition; and a second cylindrical filter section of compacted sorptive material disposed in the smoke outlet portion of said sleeve adjacent said discoidal partitions.

4. The tobacco filter cartridge of claim 3 further defined in that said successive discoidal partitions are rotated at an angle equal to about one third of the angular distance between adjacent passages in said partitions.

5. A filter as set forth in claim 1 in which said partitions are connected by an integral hub member extending axially of said section.

6. A filter as set forth in claim 1 in which said partitions are formed of cup-shaped members telescopically engageable with each other and in which the end wall of each member provides a transaxial partition for the filter.

References Cited

UNITED STATES PATENTS

| | | | |
|---|---|---|---|
| 2,954,786 | 10/1960 | Lebert | 131—264 |
| 3,079,926 | 3/1963 | Litchfield et al. | 131—265 X |
| 3,167,076 | 1/1965 | Mare | 131—10.5 |
| 3,217,715 | 11/1965 | Berger et al. | 131—10.7 |
| 3,251,365 | 5/1966 | Keith et al. | 131—10.7 |

FOREIGN PATENTS 666,308  2/1952  Great Britain.

LUCIE H. LAUDENSLAGER, *Primary Examiner.*

UNITED STATES PATENT OFFICE
CERTIFICATE OF CORRECTION

Patent No. 3,351,072

November 7, 1967

Leo Baum et al.

It is hereby certified that error appears in the above numbered patent requiring correction and that the said Letters Patent should read as corrected below.

In the heading to the printed specification, lines 3 to 5, for "Leo Baum, Oakland, and Douglas W. Watkins, Hayward, Calif. assignors to Esco Corporation, Portland, Oreg., a corporation of Oregon" read -- Leo Baum, 5625 Snake Road, Oakland, Calif. 94611; and Douglas W. Watkins, 26883 Gaither Way, Hayward, Calif. 94544 --.

Signed and sealed this 19th day of November 1968.

(SEAL)
Attest:

Edward M. Fletcher, Jr.
Attesting Officer

EDWARD J. BRENNER
Commissioner of Patents